(12) United States Patent
Hasegawa et al.

(10) Patent No.: US 8,315,740 B2
(45) Date of Patent: Nov. 20, 2012

(54) MOTION CONTROL SYSTEM, MOTION CONTROL METHOD, AND MOTION CONTROL PROGRAM

(75) Inventors: Tadaaki Hasegawa, Wako (JP); Yugo Ueda, Wako (JP); Soshi Iba, Wako (JP); Darrin Bentivegna, Kyoto (JP)

(73) Assignees: Honda Motor Co., Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 1196 days.

(21) Appl. No.: 12/137,873

(22) Filed: Jun. 12, 2008

(65) Prior Publication Data

US 2008/0312772 A1 Dec. 18, 2008

(30) Foreign Application Priority Data

Jun. 14, 2007 (JP) ................................. 2007-157470

(51) Int. Cl.
  *G05B 19/00* (2006.01)
(52) U.S. Cl. .............................. 700/260; 700/259; 901/1
(58) Field of Classification Search .................. 700/258, 700/259, 260, 264; 382/153; 901/1, 47
  See application file for complete search history.

(56) References Cited

U.S. PATENT DOCUMENTS

| | | | | |
|---|---|---|---|---|
| 4,852,018 A * | 7/1989 | Grossberg et al. | ............ | 700/259 |
| 5,554,033 A * | 9/1996 | Bizzi et al. | ............ | 434/247 |
| 6,347,261 B1 * | 2/2002 | Sakaue et al. | ............ | 700/245 |
| 6,604,021 B2 * | 8/2003 | Imai et al. | ............ | 700/245 |
| 7,095,422 B2 * | 8/2006 | Shouji | ............ | 345/629 |
| 7,127,326 B2 * | 10/2006 | Lewis | ............ | 700/258 |
| 7,259,771 B2 * | 8/2007 | Shouji | ............ | 345/629 |
| 7,689,322 B2 * | 3/2010 | Tanaka | ............ | 700/259 |
| 7,702,420 B2 * | 4/2010 | Goto et al. | ............ | 700/247 |
| 2002/0198626 A1 * | 12/2002 | Imai et al. | ............ | 700/245 |
| 2004/0036437 A1 * | 2/2004 | Ito | ............ | 318/568.12 |
| 2004/0039483 A1 * | 2/2004 | Kemp et al. | ............ | 700/245 |
| 2005/0065650 A1 * | 3/2005 | Lewis | ............ | 700/245 |
| 2005/0069208 A1 * | 3/2005 | Morisada | ............ | 382/190 |
| 2005/0093887 A1 * | 5/2005 | Shouji | ............ | 345/629 |
| 2006/0020368 A1 * | 1/2006 | Tanaka | ............ | 700/245 |
| 2006/0056678 A1 * | 3/2006 | Tanaka et al. | ............ | 382/153 |
| 2006/0179022 A1 * | 8/2006 | Holland | ............ | 706/45 |

(Continued)

FOREIGN PATENT DOCUMENTS

JP  2001-166803  6/2001

(Continued)

*Primary Examiner* — Dalena Tran
*Assistant Examiner* — Jason Holloway
(74) *Attorney, Agent, or Firm* — Rankin, Hill & Clark LLP

(57) ABSTRACT

The present invention provides a motion control system to control a motion of a second motion body, by considering an environment which a human contacts and a motion mode appropriate to the environment, and an environment which a robot actually contacts. The motion mode is learned based on an idea that it is sufficient to learn only a feature part of the motion mode of the human without a necessity to learn the others. Moreover, based on an idea that it is sufficient to reproduce only the feature part of the motion mode of the human without a necessity to reproduce the others, the motion mode of the robot is controlled by using the model obtained from the learning result. Thereby, the motion mode of the robot is controlled by using the motion mode of the human as a prototype without restricting the motion mode thereof more than necessary.

17 Claims, 11 Drawing Sheets

U.S. PATENT DOCUMENTS

| | | | |
|---|---|---|---|
| 2007/0016329 A1* | 1/2007 | Herr et al. | 700/250 |
| 2007/0078564 A1* | 4/2007 | Hoshino et al. | 700/245 |
| 2008/0086236 A1* | 4/2008 | Saito et al. | 700/245 |
| 2008/0147239 A1* | 6/2008 | Chiang et al. | 700/264 |
| 2009/0055019 A1* | 2/2009 | Stiehl et al. | 700/249 |
| 2009/0132088 A1* | 5/2009 | Taitler | 700/264 |
| 2009/0326679 A1* | 12/2009 | Iba | 700/29 |
| 2009/0326710 A1* | 12/2009 | Iba | 700/246 |
| 2010/0114807 A1* | 5/2010 | Ueda et al. | 706/25 |
| 2011/0001813 A1* | 1/2011 | Kim et al. | 348/77 |
| 2011/0118871 A1* | 5/2011 | Tsujino et al. | 700/245 |

FOREIGN PATENT DOCUMENTS

| | | |
|---|---|---|
| JP | 2002-301674 | 10/2002 |
| JP | 2006-192548 | 7/2006 |

\* cited by examiner

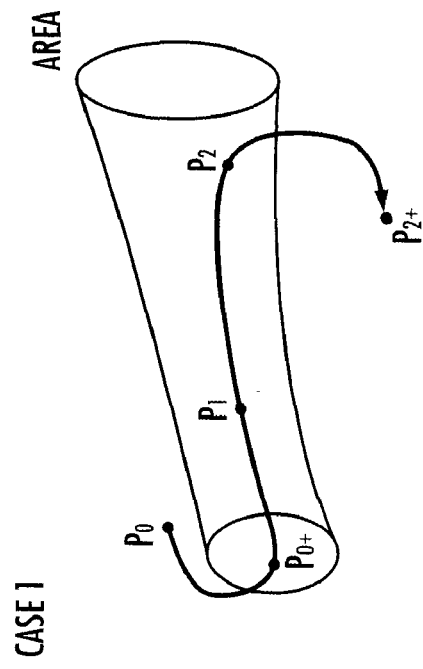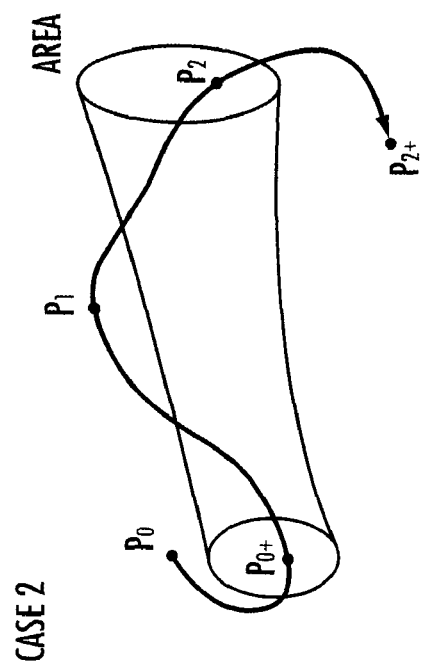

MOTION CONTROL SYSTEM, MOTION CONTROL METHOD, AND MOTION CONTROL PROGRAM

BACKGROUND OF THE INVENTION

1. Field of the Invention

The present invention relates to a motion control system and so forth for controlling a motion mode of a second motion body such as a robot and the like by using a motion mode of a first motion body such as a human and the like as a prototype.

2. Description of the Related Art

There has been disclosed a first technology method (refer to Japanese Patent Laid-open No. 2001-166803) to generate a motion rule for a robot based on a class of various examples of behaviors selected by a human in response to different environments for the robot. Moreover, in order to reproduce a motion of a human in a robot, there has been disclosed a second technology method (refer to Japanese Patent Laid-open No. 2002-301674) which segments a spatial trajectory or motion pattern of a specific point obtained from a training operation of a human (motion capture) and generates a motion pattern for the robot by combining the segmented spatial trajectories.

However, according to the first technological method, the motion pattern of the robot is limited to the class of plural examples of behaviors serving as a learning result. Further, according to the second technological method, the motion pattern of the robot is restricted to the combination of the segmented spatial trajectories serving as the learning result. Therefore, according to the first and second technological methods, in the case where the robot contacts an arbitrary environment, it is possible that the robot is forced to perform a motion in an inappropriate pattern with respect to the environment.

SUMMARY OF THE INVENTION

The present invention has been accomplished in view of the aforementioned problems, and it is therefore an object of the present invention to provide a motion control system which is capable of controlling a motion of a second motion body more appropriately than a conventional art, by considering an environment which a human (first motion body) contacts and a motion mode in response to the environment, and an environment which a robot (second motion body) actually contacts.

The motion control system of a first aspect is a control system for controlling a motion mode of a second motion body by using a motion mode of a first motion body as a prototype, including: a first processing element which determines a fraction of an extrinsic factor representing an environment encircling the first motion body as an extrinsic feature factor and a fraction of an intrinsic factor representing the motion mode of the first motion body as an intrinsic feature factor for each motion reiterated by the first motion body in response to a different environment, and defines a model representing a consecutive correlation of the extrinsic feature factor and the intrinsic feature factor on the basis of a discrete correlation of the extrinsic feature factor and the intrinsic feature factor obtained from the determination result; and a second processing element which determines the extrinsic feature factor contacted by the second motion body, calculates the intrinsic feature factor on the basis of the determination result and the model defined by the first processing, and controls the motion mode of the second motion body to implement at least the calculated intrinsic feature factor.

According to the motion control system of the first aspect, the motion mode of the first motion body is learned based on the idea that it is sufficient to learn only the feature part of the motion mode of the first motion body without a necessity to learn the others. In detail, the "extrinsic feature factor" which is a part or feature part of the "extrinsic factor" representing the environment that the first motion body contacts and the "intrinsic feature factor" which is a part or feature part of the "intrinsic feature" representing the motion mode of the first motion body are determined. Thereafter, based on the discrete correlation of the extrinsic feature factor and the intrinsic feature factor obtained from the determination result, the "model" representing the consecutive correlation of the extrinsic feature factor and the intrinsic feature factor is defined or determined. Therefore, without determining thoroughly the respective extrinsic feature factor and the intrinsic feature factor in a domain of definition, it is possible to determine the model which unambiguously specifies the intrinsic feature factor based on an arbitrary extrinsic feature factor. It can be said that the model is a model that roughly denotes a tendency of the behavior or motion mode of the first motion body in various environments with the feature part of the respective extrinsic feature factor and the intrinsic feature factor but not a model that thoroughly denotes the same with the entirety of the extrinsic feature factor and the intrinsic feature factor. In addition, it is possible to select the extrinsic and intrinsic factors fulfilling the condition that the consecutive correlation may be defined from the determination result of the respective extrinsic and intrinsic factors as the extrinsic feature factor and the intrinsic feature factor. It is also possible to set preliminarily the extrinsic feature factor and the intrinsic feature factor as a determination object according to an empirical rule based on experiments or researches.

Moreover, on the basis of the idea that it is sufficient to reproduce only the feature part of the motion mode of the human 1 without a necessity to reproduce the others, the motion mode of the second motion body is controlled by using learning result as the model. In detail, the extrinsic feature factor contacted by the second motion body is determined, and the intrinsic feature factor is calculated based on the model as the learning result thereof and the determination result. Since the model represents the consecutive correlation of the extrinsic feature factor and the intrinsic feature factor, it is possible to calculate unambiguously the intrinsic feature factor based on an arbitrary extrinsic feature factor. Further, a motion plan is set up so as to implement at least the calculated intrinsic feature factor and the motion mode of the second motion body is controlled according to the motion plan.

According to the aforementioned learning method and usage of the learning result, it is possible to control the motion mode of the second motion body by using the motion mode of the first motion body as a prototype without being restricted by the motion mode thereof more than necessary. Therefore, it is capable to control the motion of the second motion body more appropriately than the conventional art, by considering an environment which the first motion body contacts and a motion mode in response to the environment, and an environment which the second motion body actually contacts.

The motion control system of a second aspect includes the motion control system of the first aspect, wherein the first processing element evaluates a deviation degree between the discrete correlation of the extrinsic feature factor and the intrinsic feature factor obtained from the determination result and the consecutive correlation of the extrinsic feature factor and the intrinsic feature factor defined according to the discrete correlation, and defines the model representing the consecutive correlation on a condition that the deviation degree is not greater than a threshold value.

According to the motion control system of the second aspect, the model representing the consecutive correlation is defined on the condition that the deviation degree between the discrete correlation of the extrinsic feature factor and the intrinsic feature factor and the consecutive correlation of the extrinsic feature factor and the intrinsic feature factor defined according to the discrete correlation is not greater than the threshold value. Accordingly, an appropriate model is defined from the viewpoint of representing the tendency of the motion mode of the first motion body in response to various environments. In addition, the extrinsic feature factor and the intrinsic feature factor are re-determined so that the condition is fulfilled, and the model may be re-defined according to the re-determined result. Therefore, the motion mode of the second motion body may be controlled to follow the rough tendency of the motion mode of the first motion body on the basis of the model. In other words, it is possible to prevent an inappropriate model from being defined from the viewpoint of representing the rough tendency of the motion mode of the first motion body, therefore, avoiding the motion mode of the second motion body being controlled according to the inappropriate model.

The motion control system of a third aspect includes the motion control system of the second aspect, wherein the first processing element defines the model by removing a fraction or the entirety of the determination result of the extrinsic feature factor and the intrinsic feature factor so as to fulfill the condition.

According the motion control system of the third aspect, in order to fulfill the condition that the deviation degree between the discrete correlation of the extrinsic feature factor and the intrinsic feature factor and the consecutive correlation of the extrinsic feature factor and the intrinsic feature factor defined according to the discrete correlation is not greater than the threshold value, the determination result of the two feature factors representing the discrete correlation is optionally selected. Accordingly, the model representing the consecutive correlation of the two feature factors is defined based on the optionally selected determination result and the motion mode of the second motion body is controlled based on the model. Therefore, it is possible to define an appropriate model from the viewpoint of representing the tendency of the motion mode of the first motion body, thereafter, to control the motion mode of the second motion body to follow the rough tendency of the motion mode of the first motion body based on the model.

The motion control system of a fourth aspect includes the motion control system of the first aspect, wherein the first processing element determines the extrinsic feature factor and the intrinsic feature factor for each motion reiterated by the first motion body in a given style in response to a different environment for plural times.

According to the motion control system of the fourth aspect, it is possible to define the model with respect to each of the plurality of different styles. Accordingly, the motion mode of the second motion body is controlled so that the second motion body moves according to a style corresponding to one model by setting a motion plan based on the one model.

The motion control system of a fifth aspect includes the motion control system of the first aspect, wherein the first processing element sequentially defines the model along with a supplement to the determination result of the extrinsic feature factor and the intrinsic feature factor of the first motion body; and the second processing element sequentially controls the motion mode of the second motion body on the basis of the model sequentially defined by the first processing element.

According to the motion control system of the fifth aspect, it is capable to control the motion mode of the second motion body based on the model as the newest learning result from the motion mode of the first motion body.

The motion control system of a sixth aspect includes the motion control system of the first aspect, wherein the second processing element sequentially determines the extrinsic feature factor contacted by the second motion body, and sequentially controls the motion mode of the second motion body on the basis of the sequentially determined extrinsic feature factor.

According to the motion control system of the sixth aspect, even though the environment which the second motion body contacts, and consequently the extrinsic feature factor representing the environment, varies, it is possible to control the motion mode of the second motion body appropriately by considering the newest determination result of the extrinsic feature factor.

The motion control system of a seventh aspect includes the motion control system of the first aspect, wherein the first processing element determines a position of an object when an acting force is applied thereon in response to one movement of a specific part of the first motion body as the extrinsic feature factor, and a position of the specific part when the one movement is terminated as the intrinsic feature factor.

According to the motion control system of the seventh aspect, the model which determines the terminated position of the specific part of the second motion body based on an arbitrary position of the object is defined as a learning result of the motion mode in which an acting force is applied on the object in response to one movement of the specific part of the first motion body. Thereby, the one movement of the second motion body can be controlled so as to implement at least the terminated position (intrinsic feature factor) of one movement of the specific part of the second motion body on the basis of the predicted position (extrinsic feature factor) of an object when an acting forcing is applied thereon in response to the one movement of the specific part of the second motion body and the model.

The motion control system of an eighth aspect includes the motion control system of the first aspect, wherein the first processing element extracts a class having regularity from the determination result of the extrinsic feature factor and the intrinsic feature factor of the first motion body as a regular class, and defines the model on the basis of the regular class.

According to the motion control system of the eighth aspect, the model is defined based on only the determination result fulfilling the condition by removing those who do not fulfill the condition of regularity from the determination result of the extrinsic feature factor and the intrinsic feature factor. Accordingly, it is possible to define an appropriate model from the viewpoint of controlling the motion mode of the second motion body based on the regular portions of the motion mode of the first motion body.

The motion control system of a ninth aspect includes the motion control system of the eighth aspect, wherein the first processing element performs determination by relating an intrinsic additional factor which is a fraction of the intrinsic factor for a motion of the first motion body every round to the extrinsic feature factor and the intrinsic feature factor, and extracts the regular class by utilizing a condition that the respective determination result of the extrinsic feature factor and the intrinsic feature factor is related to determination points grouped in a high density in a space defined by the intrinsic additional factor as the regularity.

According to the motion control system of the ninth aspect, one or plural "intrinsic additional factors" related to the determination result of the respective extrinsic feature factor and the intrinsic feature factor are determined. Further, a class of the determination result of the extrinsic feature factor and the intrinsic feature factor relating to the determination points grouped in high density in the space defined by the intrinsic additional factor is extracted as the regular class. Accordingly, by considering the degree of unity of the determination result of the intrinsic additional factor, it is possible to remove the irregular determination result of the extrinsic feature factor and the intrinsic feature factor, which is not the determination result when the first motion body moves in the given style. Therefore, by using the regular class, it is possible to define an appropriate model as a learning result of the motion mode of the first motion body in the given style. Note that "the density of the determination points of the intrinsic additional factor is high" refers to that the density is equal to or greater than the threshold value, or the density is within a given order in plural areas, or the like.

The motion control system of a tenth aspect includes the motion control system of the eighth aspect, wherein the first processing element defines the model on the basis of the determination result of the extrinsic feature factor and the intrinsic feature factor when the first motion body reiterates a motion in a given style in a different environment for a plurality of times; in the case where a plurality of the competitive regular classes are extracted, the first processing element defines a new style corresponding to the respective plurality of the regular classes and re-defines the model on the basis of the determination result of the extrinsic feature factor and the intrinsic feature factor when the first motion body reiterates a motion in the new style for a plurality of times.

According to the motion control system of the tenth aspect, in the case where plural models may be defined as a learning result of the motion mode of the first motion body according to one style, a plurality of new styles are defined. Thereafter, the motion mode of the first motion body in response to each of the plurality of new styles is preliminarily learned. Then, the motion mode of the second motion body may be controlled based on one model defined in response to one style as the learning result of the motion mode of the first motion body. Accordingly, regardless of the motion mode of the second motion body being controlled based on one model, the second motion body is prevented from moving in a different style in response to a similar environment.

The motion control system of an eleventh aspect includes the motion control system of the first aspect, wherein the first processing element defines a plurality of local models having different domains of definition and a common property based on the determination result of the extrinsic feature factor and the intrinsic feature factor of the first motion body, and defines the model by connecting the local models in the adjacent domains of definition.

According to the motion control system of the eleventh aspect, a plurality of local models are defined in different domains of definition, and a final model is defined by integrating the plurality of local models. Since each local model has common property, different local models may be defined according to a common rule for representing the property. Thereby, it is possible to simplify the definition of the local model, and consequently the definition of the model.

The motion control system of a twelfth aspect includes the motion control system of the eleventh aspect, wherein the first processing element defines a linear model as the local model having the common property.

According to the motion control system of the twelfth aspect, different local models may be defined according to the common rule for representing the linear model. Herein, "linear model" denotes a linear map in which the intrinsic feature factor y in domain of value is represented by using an arbitrary extrinsic feature factor x (vector or scalar) in domain of definition as cx (wherein c is a coefficient or a diagonal matrix of coefficients). Thereby, it is capable to simplify the definition of the local model, and consequently the definition of the model.

The motion control system of a thirteenth aspect includes the motion control system of the eleventh aspect, wherein the first processing element defines the local model on the basis of the determination result of the extrinsic feature factor and the intrinsic feature factor by using a statistical method for extracting a local property of the model.

According to the motion control system of the thirteenth aspect, by using the statistical method for extracting a local property of the model, the local model having a specific property may be defined respectively in the different domains of definition.

The motion control system of a fourteenth aspect includes the motion control system of the thirteenth aspect, wherein the first processing element defines the local model by using LWPR (Locally Weighted Projection Regression) algorithm as the statistical method.

According to the motion control system of the fourteenth aspect, the local model having a specific property may be defined respectively in the different domains of definition according to LWPR algorithm.

The motion control system of a fifteenth aspect includes the motion control system of the first aspect, wherein the first processing element defines the model on the basis of the determination result of the extrinsic feature factor and the intrinsic feature factor of a human as the first motion body, and the second processing element controls the motion mode of a humanoid robot as the second motion body on the basis of the model defined by the first processing element.

According to the motion control system of the fifteenth aspect, it is possible to control the motion mode of a humanoid robot by using the motion mode of a human as a prototype without being restricted by the motion mode thereof more than necessary. Accordingly, for example, movements of one or two arms of the robot may be controlled to reproduce roughly the movements of one or two arms of a human in response to various environments. It is also possible to control movements of one or two legs of the robot so as to reproduce roughly the movements of one or two legs of the human in response to various environments.

A motion control method of a sixteenth aspect is a control method for controlling a motion mode of a second motion body by using a motion mode of a first motion body as a prototype, which implements processing of the respective first and second processing elements included in the motion control system of the first aspect.

According to the motion control method of the sixteenth aspect, it is possible to control the motion mode of the second motion body by using the motion mode of the first motion body as a prototype without being restricted by the motion mode thereof more than necessary.

A motion control program of a seventeenth aspect is a control program causing a computer to function as a motion control system for controlling a motion mode of a second motion body by using a motion mode of a first motion body as a prototype, which causes the computer to function as the motion control system of the first aspect.

According to the motion control method of the seventeenth aspect, it is possible to cause the computer functioning as the motion control system for controlling the motion mode of the second motion body by using the motion mode of the first motion body as a prototype without being restricted by the motion mode thereof more than necessary

BRIEF DESCRIPTION OF THE DRAWINGS

FIGS. 10(a) and 10(b) are explanatory views illustrating definition of the regular class.

DETAILED DESCRIPTION OF THE PREFERRED EMBODIMENTS

Embodiments of a motion control system of the present invention will be explained with reference to the drawings.

First, the motion control system as an embodiment of the present invention and a configuration of a robot serving as a control object thereof are explained.

Figure 1:
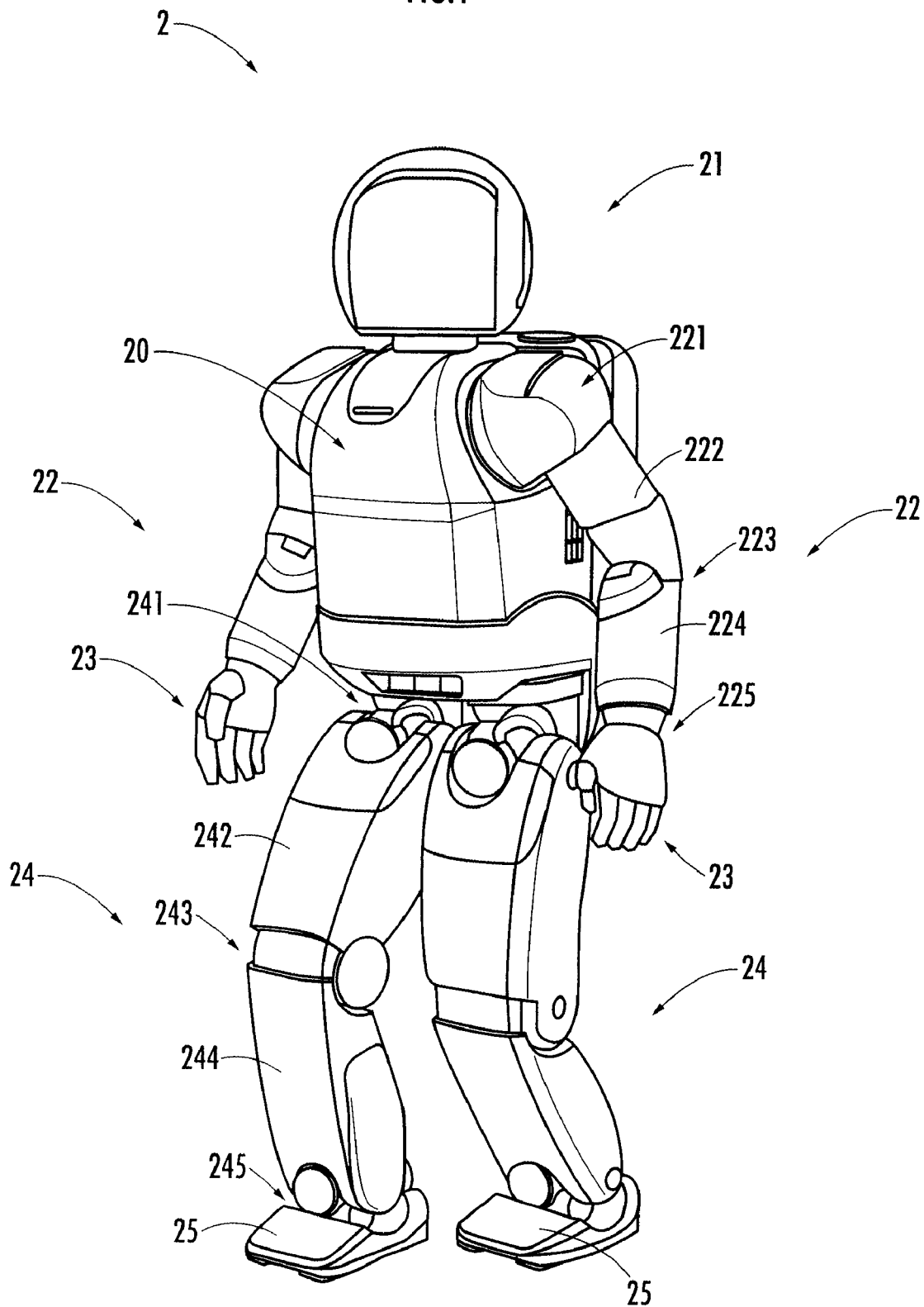
FIG. 1 is an explanatory view illustrating a configuration of a robot as a control object for a motion control system as an embodiment of the present invention.

A robot (second motion body) 2 illustrated in FIG. 1 is a humanoid robot having a function to reproduce a motion of a human (first motion body) 1, including a body (upper body) 20, a head 21 disposed at the upper end of the body 20, right and left arms 22 which are provided at an upper portion of the body 20 by extending from both sides thereof, respectively, right and left hands 23 provided at the respective end of the right and left arms 22, right and left legs 24 which are provided respectively at a lower portion of the body 20 by extending downward thereof, right and left feet 25 which are provided at the respective end of the right and left legs 24. Moreover, the robot 2 includes a plurality of sensors 204 (refer to FIG. 2) for determining various intrinsic factors representing a motion mode of the robot 2 such as a rotary encoder which outputs a signal in response to each angle of joints of the arm 22 and legs 24 and so forth, a six-axis force sensor or the like which outputs a signal in response to an acting force applied on the hand 23, the foot 25 and so forth. Further, the robot 2 is provided with an actuator 206 (refer to FIG. 2) disposed at each joint portion of the arm 22, hand 23, leg 24 and so forth as a driving source thereof.

The body 20 is constituted from an upper part and a lower part which are connected vertically so as to be able to turn relatively around a yaw axis. The head 21 can perform motions, such as turning around the yaw axis with respect to the body 20 and so forth.

The arm 22 includes a first arm link 222 and a second arm link 224. The body 20 and the first arm link 222 are connected via a shoulder joint 221. The first arm link 222 and the second arm link 224 are connected via an elbow joint 223. The second arm link 224 and the hand 23 are connected via a wrist joint 225. The shoulder joint 221 has degrees of freedom of turning around a roll, a pitch and a yaw axes. The elbow joint 223 has a degree of freedom of turning around a pitch axis. The wrist joint 225 has degrees of freedom of turning around a roll, a pitch and a yaw axes. The hand 23 is extended from a palm and includes a five-finger mechanism corresponding to a thumb, an index finger, a middle finger, a ring finger and a little finger of a human hand.

The leg 24 includes a first leg link 242 and a second leg link 244. The body 20 and the first leg link 242 are connected via a hip joint 241. The first leg link 242 and the second leg link 244 are connected via a knee joint 243. The second leg link 244 and the foot 25 are connected via an ankle joint 245. The hip joint 241 has degrees of freedom of rolling, pitching and turning around the yaw axis. The knee joint 243 has a degree of freedom of turning around the pitch axis. The ankle joint 245 has degrees of freedom of turning around the roll and pitch axes.

Figure 2:
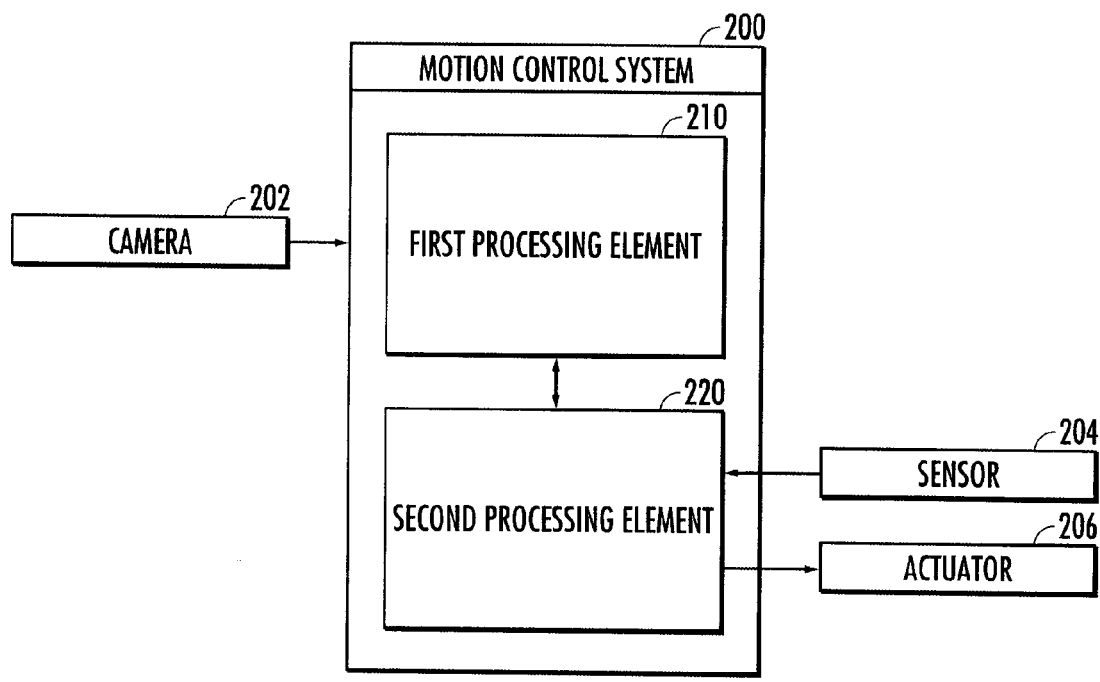
FIG. 2 is an explanatory view illustrating a configuration of the motion control system as an embodiment of the present invention.

The robot (second motion body) 2 includes a motion control system 200 as illustrated in FIG. 2. The motion control system 200 includes a CPU, a ROM, a RAM and an I/O, defines a learning result of a motion mode of the human (the first motion body) 1 as a model and controls the motion mode of the robot 2 according to the model. Note that it is also possible for the motion control system to be a distribution control system constituted from a main control unit and one or plural sub control units connected via an inner network in the robot 2.

A motion control program for functionalizing a computer mounted on the robot 2 as the motion control system 200 may be stored preliminarily in a memory device such as ROM and so forth, or may be distributed to the computer (download) or broadcast from a server via a network or satellite at arbitrary time when there is a request from the vehicular computer or the like and then stored in the memory used by the program.

The motion control system 200 includes a first processing element 210 and a second processing element 220. It is possible constitute the first processing element 210 and the second processing element 220 from the same CPU or processor, or from different CPUs or processors.

The first processing element 210, on the basis of an image obtained from the human 1 via a camera (tracker) 202 disposed in the surroundings of the human 1, determines a featured part of an "extrinsic factor" representing an environment when the human performs a motion and an "intrinsic factor" representing a motion mode as an "extrinsic feature factor" and an "intrinsic feature factor", respectively. Thereafter, based on a discrete correlation of the extrinsic feature factor and the intrinsic feature factor obtained from the determination result, the first processing element 210 defines a "model" representing a consecutive correlation of the extrinsic feature factor and the intrinsic feature factor.

The second processing element 220 determines the "extrinsic feature factor" which is a part of the extrinsic factor representing the environment the robot contacts. Thereafter, the second processing element 220 calculates the "intrinsic feature factor" based on the determination result of the extrinsic feature factor and the model defined by the first processing element 210. Further, the second processing element 220 controls the motion mode of the robot 2 through a feedback control on operation of the actuator 206 based on an output from the sensor 204 so as to implement at least the calculated intrinsic feature factor.

Hereinafter, explanations will be carried out on functions of the motion control system with the aforementioned configuration.

Figure 3:
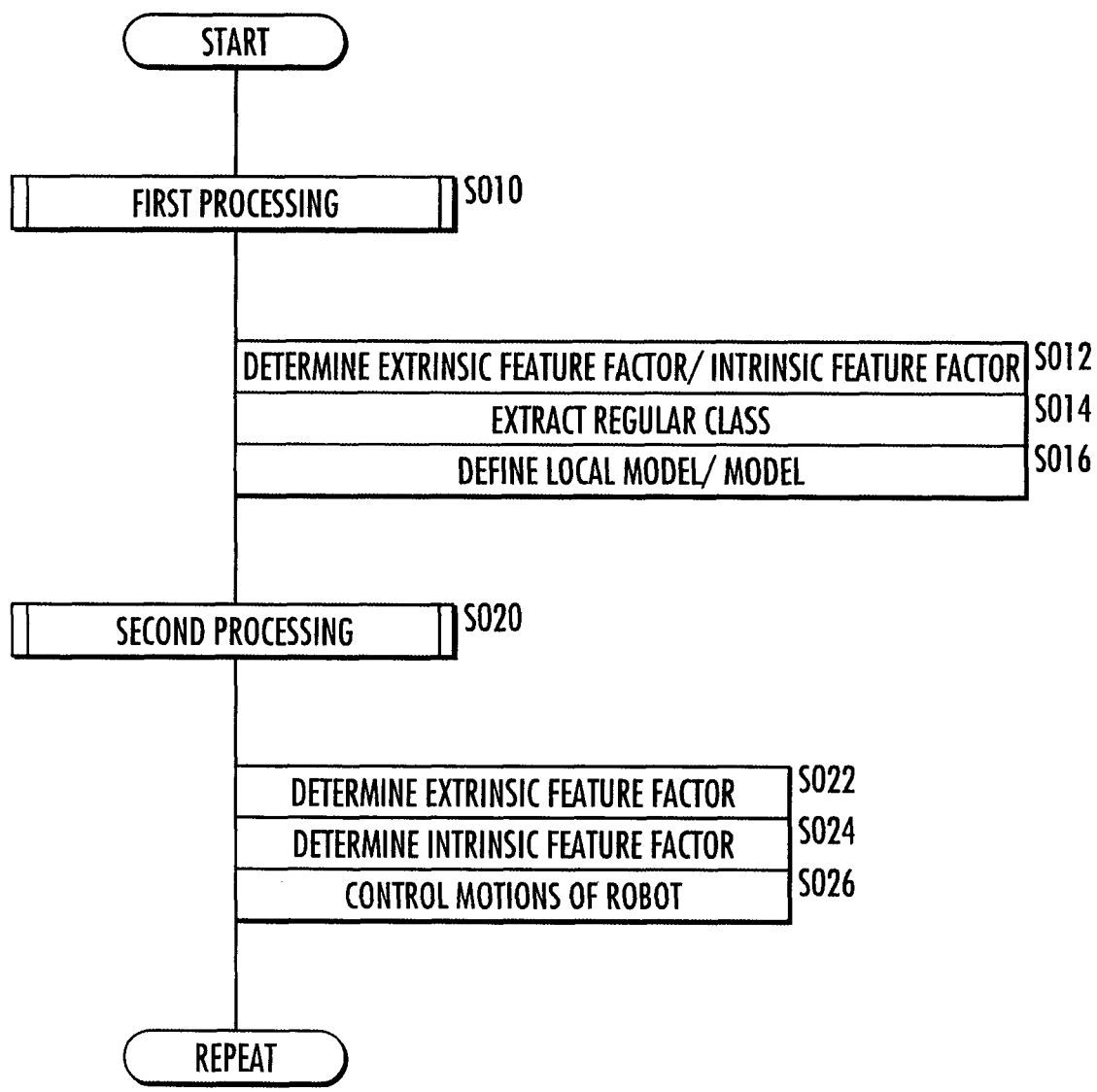
FIG. 3 is an explanatory view illustrating a motion control method as an embodiment of the present invention.

First, the first processing element 210 performs a "first processing" (FIG. 3/S010).

Consequently, for example as illustrated in FIG. 4(a) to FIG. 4(c), a model is defined as a learning result of a motion mode in a given style that the human 1 hits back forehand a ball Q flying from the front with a racket R held in the right hand. In detail, the model is defined as the learning result of the motion that the human 1 hits the ball Q flying from the front with a front face of the racket R by moving the racket R from a standby state that the human 1 holds the racket R in the right hand and faces the front face of the racket toward the front at roughly the same height as the shoulder by flexing the right elbow.

Specifically, the feature part of the respective extrinsic and intrinsic factors are determined as the extrinsic feature factor and the intrinsic feature factor when the human 1 reiterates the motion according to the given style (FIG. 3/S012).

The extrinsic factor refers to a factor representing an environment which the human 1 contacts. In the above mentioned example, a position of the ball Q at an arbitrary time and a temporal differentiation (velocity, acceleration or the like) thereof correspond to the extrinsic factor (element constituting the environment divided in terms of space and time). The intrinsic factor refers to a factor representing the motion mode of the human 1. In the above mentioned example, a position of a specific part (wrist, elbow, shoulder or the like) of the human 1 and an angle of each joint at an arbitrary time and temporal differentiations thereof (velocity and acceleration of the specific part, and angular velocity and angular acceleration of a joint, and so forth), a length and azimuth orientation of a relative vector of the specific part in a different time, a relative position and relative velocity and the others of a plurality of different specific parts correspond to the intrinsic factor (element constituting the motion mode divided in terms of space and time).

The position of the specific part at an arbitrary time is determined by, for example, an optical motion capturing system. According to the optical motion capturing system, the position of the specific part of the human 1 is determined on the basis of a determination result of a maker attached to the body of the human 1 by one or a plurality of cameras (tracker) 202 disposed on the surroundings of the human 1. A position of the ball Q at an arbitrary time is determined according to a determination result of the ball Q or a maker attached thereon obtained by, for example, the camera 202. Additionally, it is possible for the camera (tracker) 202 which determines the respective position of the specific part and the ball Q to be a camera of the same type, or to be cameras of different types (visible light camera, infrared light camera and so forth).

In addition, it is possible to determine the wrist position at an arbitrary time with a mechanical, magnetic or inertial motion capturing system. According to the mechanical motion capturing system, the wrist position is determined based on an output signal denoting each angle of joints of the human 1 obtained from a plurality of potentiometers attached to a supporter or a suit applied to the human 1. According to the magnetic motion capturing system, the wrist position is determined on the basis of output signals from a plurality of magnetic sensors attached to the supporter or suit applied to the human 1. According to the inertial motion capturing system, the wrist position is determined based on output signals denoting inertial moments of the wrist or the like of the human 1 obtained from a plurality of inertial moment sensors attached to the supporter or suit applied to the human 1.

Figure 4:
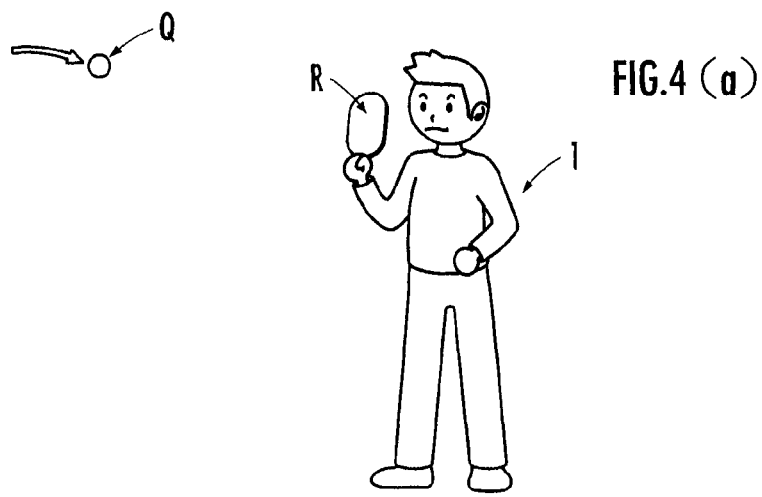
FIGS. 4(a) to 4(c) are exemplary views illustrating motion modes of a human.
Figure 4:
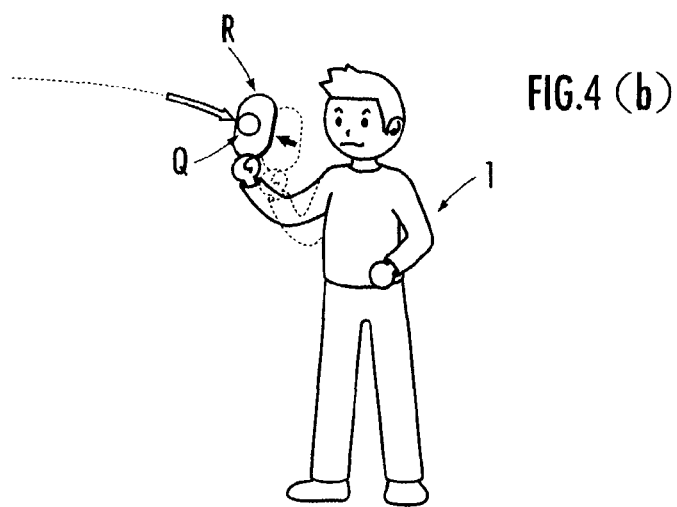
Figure 4:
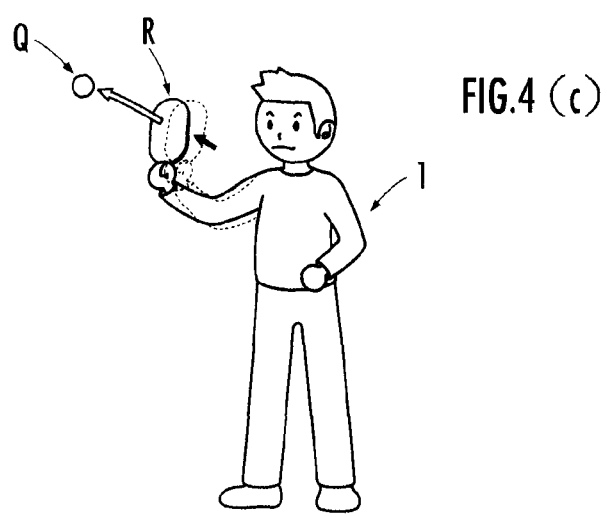
Figure 5:
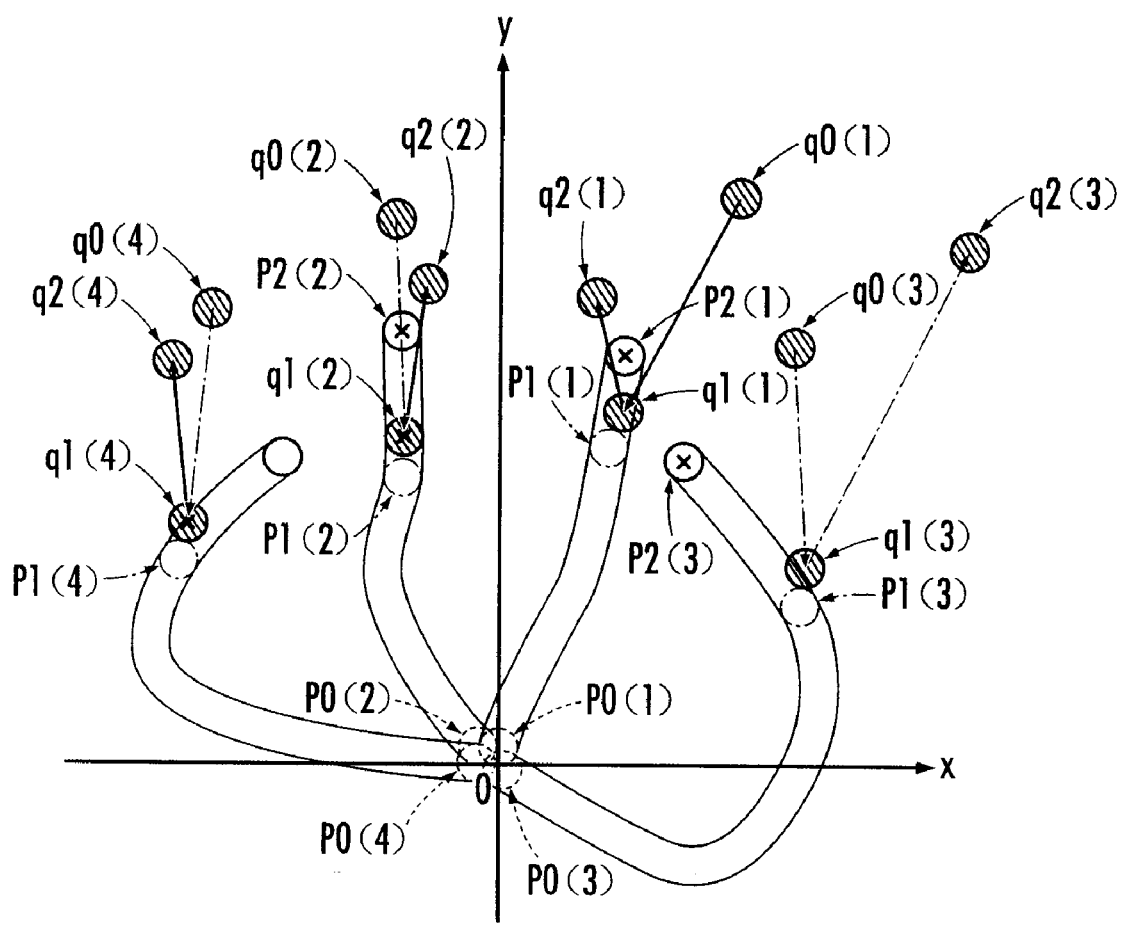
FIG. 5 is an exemplary view of an extrinsic feature factor and intrinsic feature factor.

FIG. 5 illustrates changes of the position of the wrist serving as the specific part and the ball in XY plane when the human 1 reiterates the above mentioned motion. The position of the wrist changes from an initial wrist position $p_0(i)$ (i refers to a number representing times of the motion) when the racket R is at the standby position (refer to FIG. 4(a)), passing through a first wrist position $p_1(i)$ when the ball Q hit on the moving racket R (refer to FIG. 4(b)), to a second wrist position $p_2(i)$ when the forward movement of the racket R is stopped (refer to FIG. 4(c)). Further, the position of the ball changes from an initial ball position $q_0(i)$ (refer to FIG. 4(a)), passing through a first ball position $q_1(i)$ when the ball Q hit on the moving racket R (refer to FIG. 4(b)), to a second ball position $q_2(i)$ when the forward movement of the racket R is stopped (refer to FIG. 4(c)). In addition, the positions of the wrist and the ball also change in Z direction.

In the present embodiment, the first ball position (refers to the ball position when the ball Q hit on the moving racket R) $q_1(i)$ is determined as the extrinsic feature factor. Whether the ball Q hit on the racket R is determined on a condition that a velocity change (especially the velocity change in Y direction (refer to FIG. 5)) of the ball Q is greater than a threshold value. Herein, the velocity change of the ball Q is determined by analyzing an image obtained with the camera 202, for example. It may also be determined according to the sound when the ball Q hit on the racket R. Herein, the sound is recorded with a microphone (not shown).

Further, the second wrist position (refers to the wrist position when the forward movement of the racket R is stopped) $P_2(i)$ is determined as the intrinsic feature factor (refer to FIG. 4(c)). Whether the forward movement of the racket R is stopped is determined on a condition that a velocity change (especially the velocity change in Y direction (refer to FIG. 5)) of the wrist is greater than a threshold value. Herein, the velocity change of the wrist is determined by the motion capturing system, for example.

That which extrinsic factor in arbitrary extrinsic factors corresponds to the extrinsic feature factor and which intrinsic factor in arbitrary intrinsic factors corresponds to the intrinsic feature factor may be predetermined according to an experiment, researching or the like. Another way may be: A plurality of extrinsic factors and a plurality of intrinsic factors are determined, and those extrinsic factors and intrinsic factors whose consecutive correlation may be defined meeting the condition that the deviation to the determination result is not greater than the threshold value may be specified as the respective extrinsic feature factor and the intrinsic feature factor. Positions, velocities, accelerations and so forth of the ball Q at plural times correspond to the plurality of extrinsic factors. Positions, velocities and accelerations of the wrist, elbow, shoulder and the others, together with the angle, angular velocity, angular acceleration and so on of each joint correspond to the plurality of intrinsic factors.

Moreover, a regular class is extracted by removing those determination results which do not satisfy a condition of regularity from the determination results of the extrinsic feature factor and the intrinsic feature factor (FIG. 3/S014). In detail, the initial wrist position $p_0(i)$ is determined as an "intrinsic additional factor". Furthermore, there are removed the determination results of the extrinsic feature factor $q_1(j)$ and the intrinsic feature factor $p_2(j)$ in round j which do not meet the condition of regularity, that is, "the determination results correspond to those unit cubes having high density of determination points among a plurality of unit cubes in a space (three dimensional space) defined by the intrinsic additional factors". Herein, that the determination points in a unit cube is in high density means that the density is the highest or not smaller than the threshold value. Thereafter, the class of the determination results left by removing those determination results which do not meet the condition of regularity is extracted as the "regular class".

Figure 9:
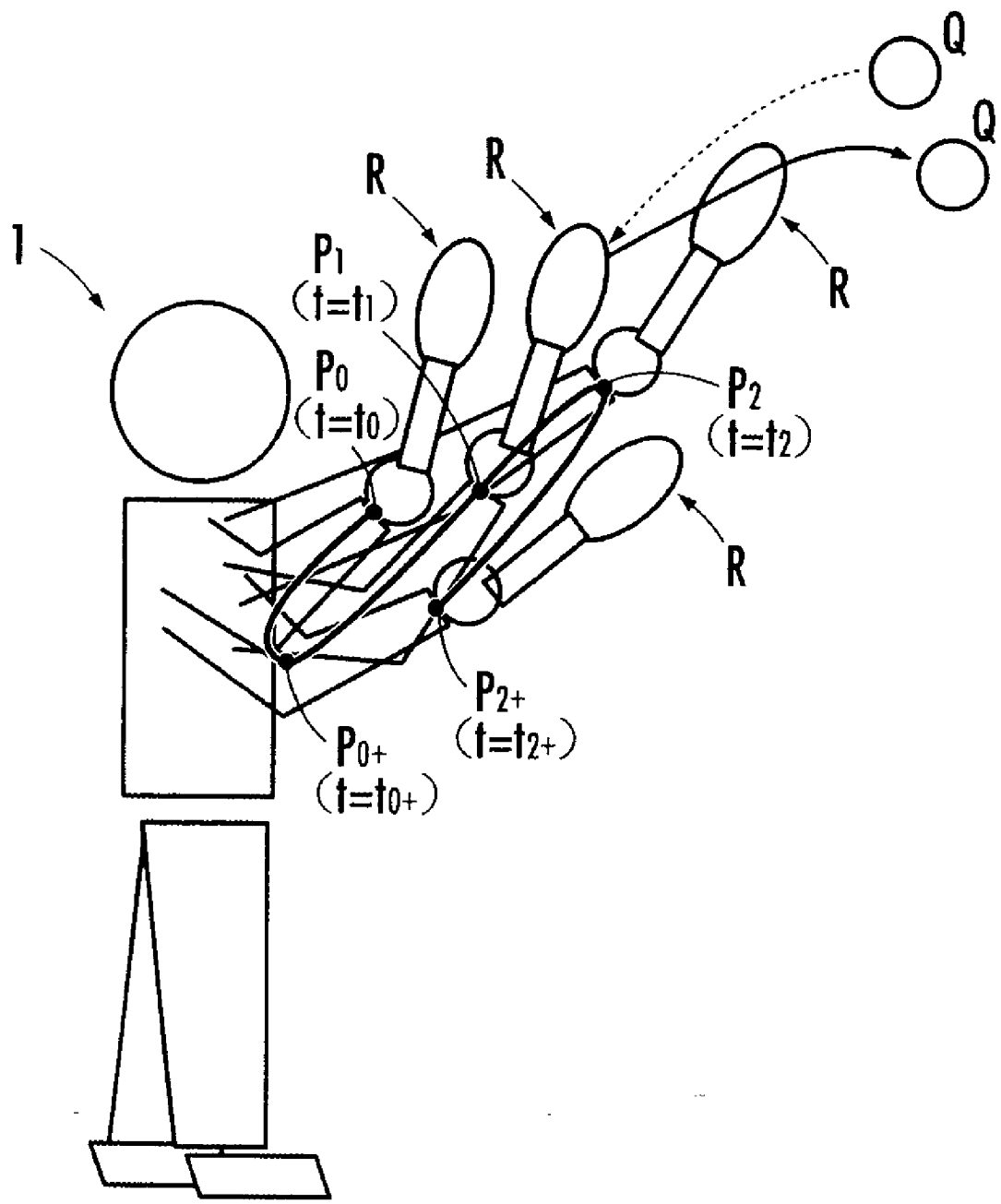
FIG. 9 is an explanatory view illustrating definition of a a regular class.

The condition may be defined in such a way that the wrist position at an arbitrary time such as the first wrist position $p_1(i)$ or the second wrist position $p_2(i)$ or the like, or the temporal differentiation of the wrist position including the velocity and acceleration and so forth of the wrist is used as the intrinsic additional factor, as an alternative or additive to the initial wrist position $p_0(i)$. Taking as an example the case as illustrated in FIG. 9 where the human 1 moves the wrist from the initial wrist position $p_0$ (time $t=t_0$) to a take back position $p_{0+}$ (time $t=t_{0+}$ ($>t_0$)), thereafter passing through the first wrist position $p_1$ (time $t=t_1$) and the second wrist position $p_2$ (time $t=t_2$) and a return position $P_{2+}$ (time $t=t_{2+}$ ($>t_2$)). As illustrated in FIG. 10(a) and FIG. 10(b), that the trajectory ($p_{0+} \sim p_1 \sim p_2$) of the wrist position from time $t_{0+}$ to time $t_2$ in the three dimensional space is contained in a roughly cylindrical area with the take back position $p_{0+}$ included at one end surface thereof may be defined as the condition of regularity. As illustrated in FIG. 10(a), when the trajectory is completely contained in the area, the determined extrinsic feature factor (first ball position $q_1$) and intrinsic feature factor (second wrist position $p_2$) are deemed to fulfill the condition of regularity, and thus included in the regular class. On the other hand, as illustrated in FIG. 10(b), when a part of the trajectory is gone beyond the area, the determined extrinsic feature factor (first ball position $q_1$) and intrinsic feature factor (second wrist position $p_2$) are deemed not to fulfill the condition of regularity, and thus removed from the regular class.

Moreover, the condition may be defined by using a position of the elbow, the shoulder or the like different from that of the wrist as the intrinsic factor (intrinsic additional factor), as an alternative or additive to the wrist of the human 1.

Figure 11:
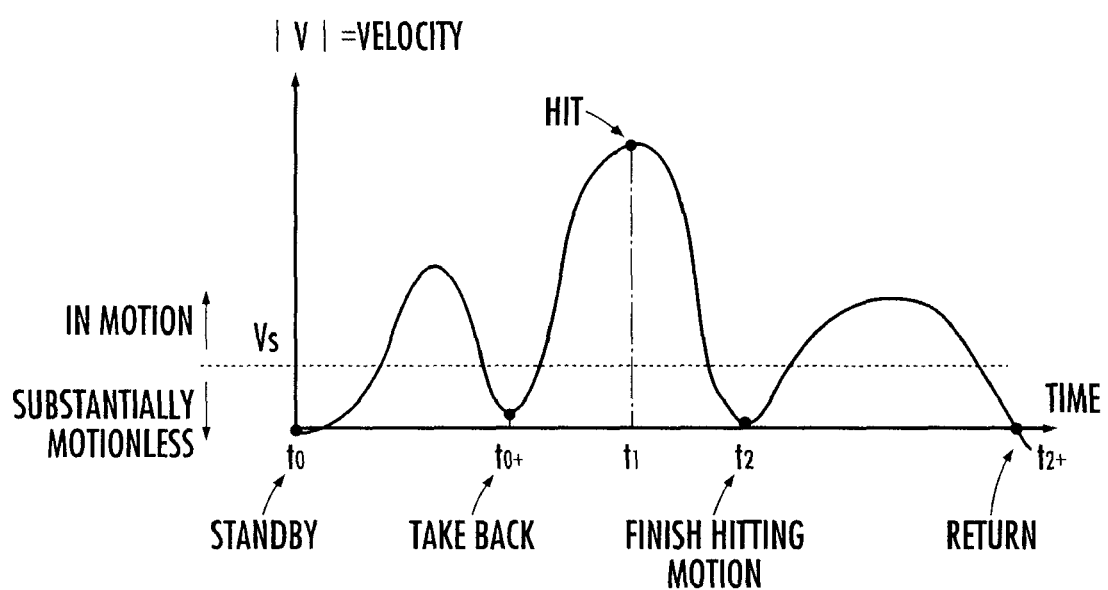
FIG. 11 is an explanatory view illustrating definition of the regular class.

Furthermore, the condition of regularity may be defined by using a temporal differentiation of velocity and acceleration and so on of a part of the body as the intrinsic additional factor, as an alternative or additive to the part of the body of the human 1. For example, in the case as illustrated in FIG. 9 where the human 1 moves the wrist, it may be defined as the condition of regularity if a velocity magnitude |v| of the wrist at respective time $t_{0+}$ and time $t_2$ is not greater than a threshold value $v_s$ (the wrist is in a still state) as illustrated in FIG. 11.

In addition, as an alternative or additive to the intrinsic additional factor, the extrinsic factor (extrinsic additional factor) of position, velocity, acceleration and the others of the ball Q at an arbitrary time, such as the initial ball position $q_0(i)$, the first ball $q_1(i)$, the second ball position $q_2(i)$ and so forth, may be used to define the condition of regularity.

The condition of regularity may be defined according to not only the spatial density of the determination points of either one or both of the intrinsic additional factor and extrinsic additional factor, but also the alignment relationship between the determination points of different factors in space such as the distance between the determination points of a combination of plural factors among the intrinsic feature factor and extrinsic feature factor. For example, it may be defined as the condition of regularity if a length or azimuth of a relative vector of the initial ball position $p_0(i)$ and the first wrist position $q_1(i)$ is within a predefined range.

Furthermore, a local model is defined by using a statistical method such as LWPR (Locally Weighted projection Regression) algorithm and the like based on the regular class having the determination results of the extrinsic feature factor and intrinsic feature factor as the constitution elements thereof, and as a combination result of the local models, the model is defined (FIG. 3/S016). Note that the model may be defined according to other statistical methods such as a regression model, a neural network model and so forth beside the LWPR algorithm. The model represents the function f in the following equation (1) representing the consecutive correlation of the extrinsic feature factor (scalar or vector) q and the intrinsic feature factor (scalar or vector) p.

$$f(q)=p \qquad (1)$$

Figure 6:
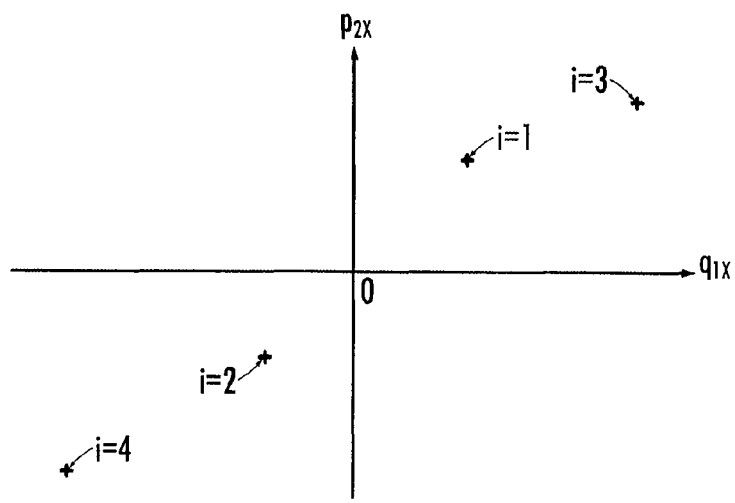
FIGS. 6(a) to 6(c) are explanatory views of a definition method of a model.
Figure 6:
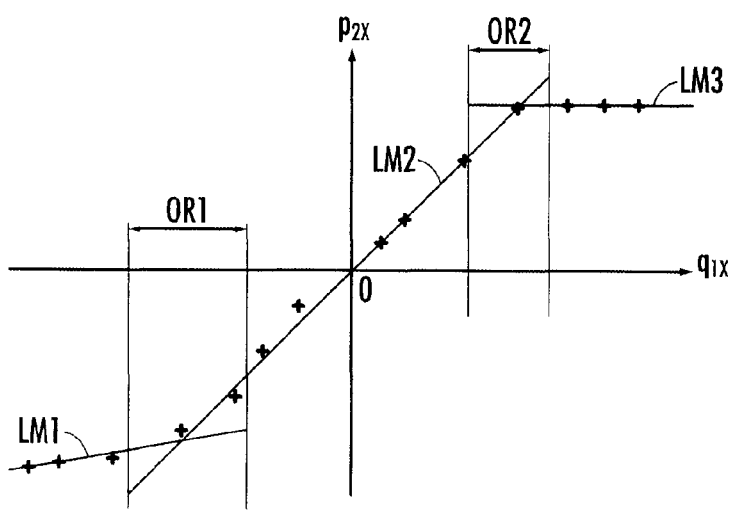
Figure 6:
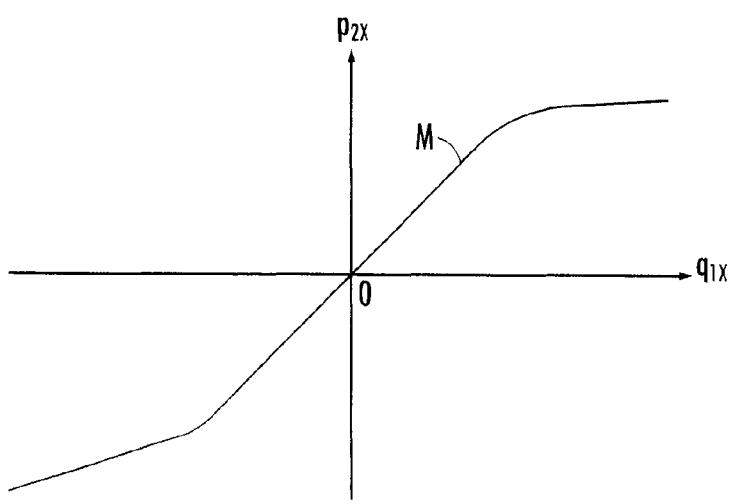

In detail, the determination results of the extrinsic feature factor $q_1(i)$ (three dimensional vector ($q_{1x}$, $q_{1y}$, $q_{1z}$) having x, y and z components) and the intrinsic feature factor $p_2(i)$ (three dimensional vector ($p_{2x}$, $p_{2y}$, $p_{2z}$) having x, y and z components) are plotted in a six dimensional space (a space defined by 6 variants of $q_{1x}$, $q_{1y}$, $q_{1z}$, $p_{2x}$, $p_{2y}$, and $p_{2z}$) defined by the extrinsic feature factor and the intrinsic feature factor. Each plot represents the discrete correlation of the extrinsic feature factor $q_1(i)$ and the intrinsic feature factor $p_2(i)$. For simplification, only the determination result of the x component of each feature factor is discussed. In the case where the human 1 repeats the hitting-back motion as illustrated in FIG. 5, the determination results of the x component of each feature factor ($q_{1x}$, $p_{2x}$) are plotted as illustrated in FIG. 6(a). The plot numbers in the space defined by the feature factors increase gradually while the human 1 repeats the motion in the same style furthermore. As a result, as illustrated in FIG. 6(b), each of the lines LM1 to LM3 representing approximately the local correlation of the x component of the respective extrinsic feature factor $q_1$ and the intrinsic feature factor $p_2$ represented by the plots is defined as the local model. Each of the local models LM1 to LM3 may be a linear model or a non-linear model. Furthermore, if each local model has a common property (for example linearity), different local models may be defined according to a common rule representing the common property. Accordingly, the definition of the local model, consequently the model, is simplified.

The model representing the consecutive correlation of extrinsic feature factor $q_1$ and the intrinsic feature factor $p_2$ is defined by overlapping plural local models. For example, the local models LM1, LM2 and LM3 as illustrated in FIG. 6(b) are weighted according to a distance between the x component of an arbitrary extrinsic feature factor $q_1$ and the x component of the center of each of the local models and overlapped thereafter. Each of the local models may be weighted by a weight corresponded to a distance normalized by a parameter representing the locality of each of the models. Consequently, there is defined the model M as illustrated in FIG. 6(c), which may determine unambiguously the x component of the intrinsic feature factor $p_2$ according to the x component of an arbitrary extrinsic feature factor $q_1$. The definition method of the model is explained by considering only the x component of each feature factor for simplification as aforementioned. However, the model is actually defined by taking the entire x component, y component and z component of each feature factor into account. In other words, as shown in equation (2), local models which are represented with a 3*3 matrix A and used to determine unambiguously an intrinsic feature factor $p_2$ ($=p_{2x}$, $p_{2y}$, $p_{2z}$) according to an arbitrary extrinsic feature factor $q_1$ ($=q_{1x}$, $q_{1y}$, $q_{1z}$) are defined, and the model is defined by overlapping the local models.

$$p_2 = A \cdot q_1 \qquad (2)$$

Subsequently, a "second processing" is performed by the second processing element 220 (FIG. 2/S020).

Figure 7:
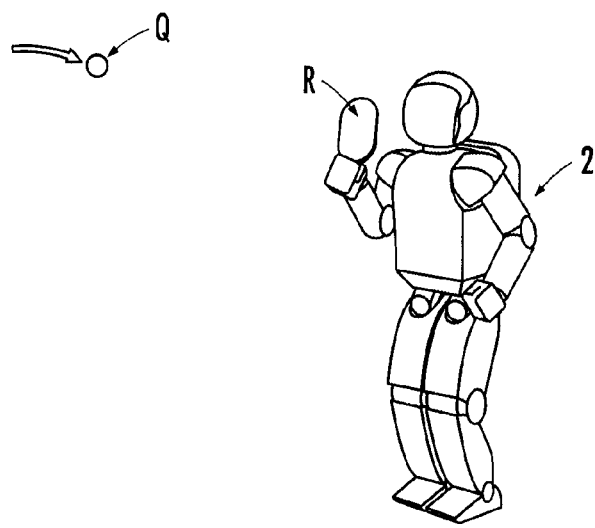
FIGS. 7(a) to 7(c) are exemplary views illustrating motion modes of a robot.
Figure 7:
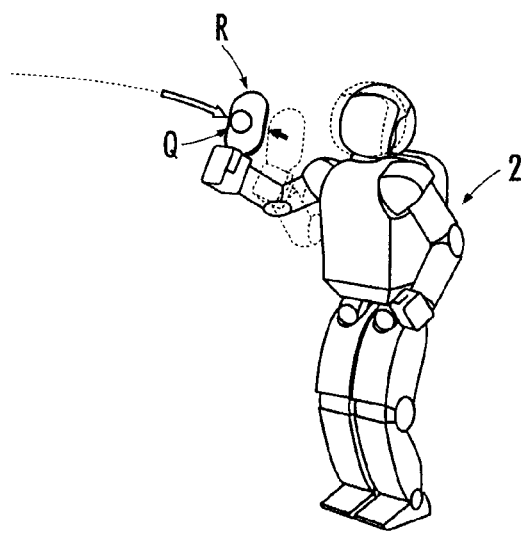
Figure 7:
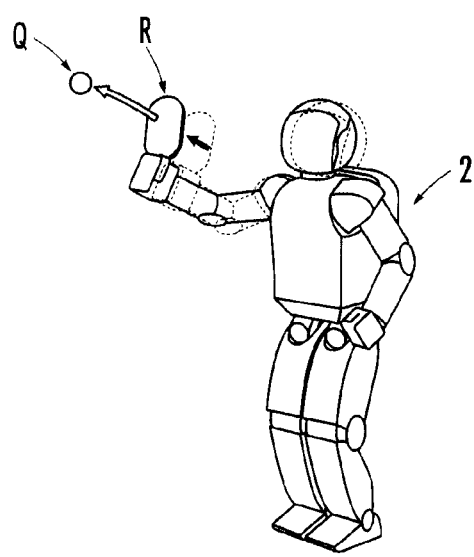

According to the second processing, for example, a motion mode in a given style that the robot (second motion body) 2 hits back forehand the ball Q flying from the front with the racket R held in the right hand 23 is reproduced as illustrated in FIG. 7(*a*) to FIG. 7(*c*) according to the model defined by the first processing element 210.

Figure 8:
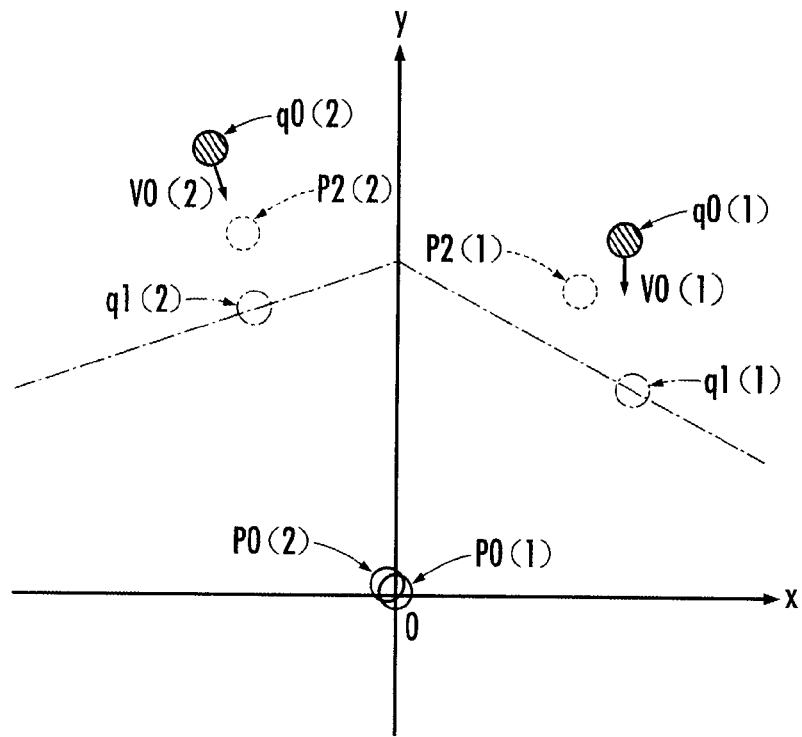
FIGS. 8(a) and 8(b) are explanatory views of a motion control method for controlling a motion mode of the robot.
Figure 8:
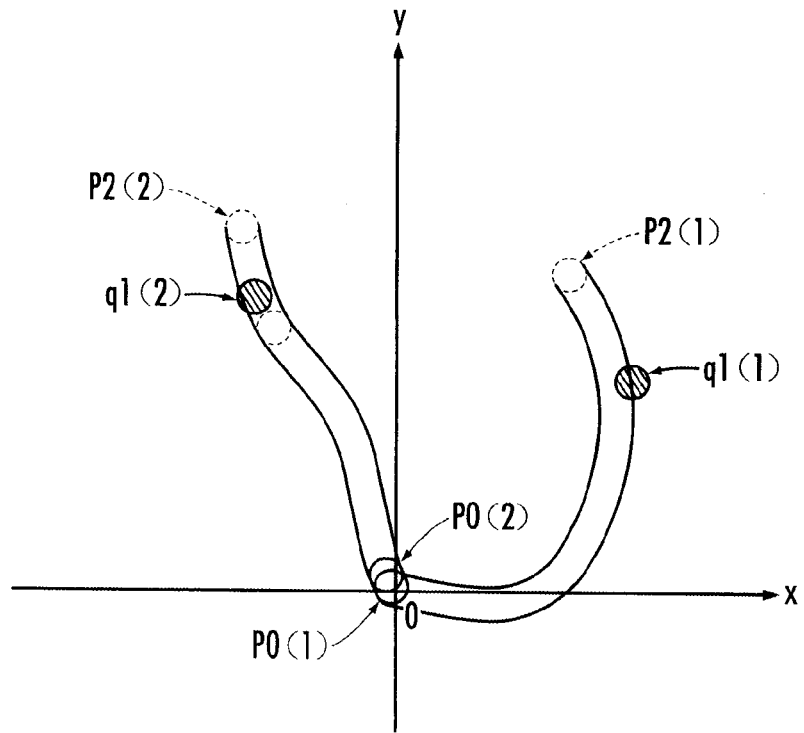

In detail, the extrinsic feature factor which the robot 2 contacts is determined (FIG. 3/S022). In the above mentioned example, the position where the robot 2 uses the racket R to hit the ball Q flying from front is predicted (determined) as the extrinsic feature factor. The position where the robot 2 uses the racket P to hit the ball Q is predicted as a position where the ball Q passes a defined planar surface or curved surface based on the present position and velocity of the ball Q determined by analyzing the image obtained with the camera 202. For example, as illustrated in FIG. 8(*a*), on the basis of the present position $q_0(k)$ (k=1, 2) and velocity $v_0(k)$ of the ball Q, the position $q_1(k)$ where the ball Q passes a surface illustrated with a chain line is predicted or determined as the extrinsic feature factor. In addition, the extrinsic feature factor which acts as the determination object for the second processing element 220 may be predefined, or may be selected from a plurality of extrinsic factors determined by the first processing element 210. Moreover, the mentioned surface may also be set asymmetrically to the robot if the fact that the robot 2 uses the racket R held in the right hand 23 to hit the ball Q is taken into account.

Thereafter, the intrinsic feature factor is calculated on the basis of the determined extrinsic feature factor $q_1(k)$ and the model defined by the first processing element 210 (FIG. 3/S024). The wrist position $p_2(k)$ of the robot 2 illustrated with a dashed line in FIG. 8(*a*) when the motion of the racket R toward the front is stopped is calculated as the intrinsic feature factor according to, for example, the model illustrated in FIG. 6(*c*). In addition, by considering the difference of size or motion scale (so-called reach or the like) between the human 1 and the robot 2, the intrinsic feature factor may be calculated by multiplying a scaling coefficient for matching the motion scales of the two.

Then, the motion mode of the robot is controlled to reproduce the intrinsic feature factor $p_2(k)$ (FIG. 3/S026). For example, as illustrated in FIG. 8(*b*), the wrist position of the robot 2 is controlled to match at least the intrinsic feature factor $p_2(k)$ calculated when the motion of the racket R toward the front is stopped. As a result, as illustrated in FIG. 7(*a*) to FIG. 7(*c*), the motion mode in a given style that the robot 2 hits back forehand the ball Q flying from the front with the racket R held in the right hand 23 is reproduced.

According to the motion control system 200 which realizes the above mentioned functions, the motion mode of the human (first motion body) 1 is learned based on the idea that it is sufficient to learn only the feature part of the motion mode of the human 1 without a necessity to learn the others (refer to FIG. 3/S010, FIG. 4(*a*) to FIG. 4(*c*)). In detail, the extrinsic feature factor (the first ball position) $q_1$ which is the feature part of the plural extrinsic factors representing the environment which the human 1 contacts, and the intrinsic feature factor (the second wrist position) $p_2$ which is the feature part of the plural intrinsic factors representing the motion mode of the human 1 are determined. Then, based on the discrete correlation of the extrinsic feature factor $q_1$ and the intrinsic feature factor $p_2$ obtained from the determination result, the model representing the consecutive correlation of the extrinsic feature factor $q_1$ and the intrinsic feature factor $p_2$ is defined (refer to FIG. 3/S012 and S016, FIG. 6(*a*) to FIG. 6(*c*)). Consequently, it is possible to define the model for specifying unambiguously the intrinsic feature factor $p_2$ based on an arbitrary extrinsic feature factor $q_1$ without determining thoroughly the respective extrinsic feature factor $q_1$ and the intrinsic feature factor $p_2$ in the domains of definition. It can be said that the model is a model that roughly represents a tendency of the behavior or motion mode of the human 1 in various environments by the feature part of the respective extrinsic and intrinsic factors but not a model that thoroughly represents the same by the entirety of the extrinsic and intrinsic factors.

Moreover, on the basis of the idea that it is sufficient to reproduce only the feature part of the motion mode of the human 1 without a necessity to reproduce the others, the motion mode of the robot 2 is controlled by using the model from the learning result (refer to FIG. 3/S020, FIG. 7(*a*) to FIG. 7(*c*)). In detail, the extrinsic feature factor $q_1$ contacted by the robot 2 is determined, and the intrinsic feature factor $p_2$ is calculated based on the determination result and the model from the learning result (refer to FIG. 3/S022 and S024). Since the model represents the consecutive correlation of the extrinsic feature factor $q_1$ and the intrinsic feature factor $p_2$, it is possible to calculate unambiguously the intrinsic feature factor $p_2$ based on an arbitrary extrinsic feature factor $q_1$. Further, a motion plan is set up so as to implement at least the calculated intrinsic feature factor $p_2$, and the motion mode of the robot 2 is controlled according to the motion plan.

According to the aforementioned learning method and application method of the learning result, it is possible to control the motion mode of the robot 2 by using the motion mode of the human 1 as a prototype without being restricted by the motion mode thereof more than necessary. Thereby, it is capable to control the motion of the robot 2 appropriately by considering an environment which the human 1 contacts and a motion mode appropriate to the environment, and a real environment which the robot 2 contacts.

Further, by considering the degree of unity of the determination result of the intrinsic additional factor $p_0$, it is possible to extract the regular class by removing the determination result which is not the one when the human 1 moves in the given style (not fulfill the condition of regularity) (refer to FIG. 3/S014). Accordingly, the determination result of, for example, the position of the racket R held by the human 1 or the initial wrist position (intrinsic additional factor) $p_0$ is in a state which is remarkably different from the other cases is removed when defining the model. Thereby, by using the regular class, it is possible to define the model appropriately as a learning result of the motion mode of the human 1 in the given style.

Additionally in the aforementioned embodiment, the model is defined as a learning result of a motion mode of the human 1 serving as the "first motion body", and a motion mode of the robot 2 serving as the "second motion body" is controlled based on the model. However, it is also possible to define a model as a learning result of a motion mode of an animal such as a horse, a dog or the like different from a human acting as the first motion body and to control a motion mode of a zoomorphic robot which simulates the animal and serves as the second motion body based on the model. Moreover, it is also possible to define a model as a learning result of a motion mode of a robot acting as the first motion body and to control another robot of the same type serving as the second motion body based on the model.

Further in the aforementioned embodiment, the model is defined as a learning result of the motion mode that the human 1 hits back (forehand) the ball (object) Q flying from the front with the racket R held in one hand (specific part), and the motion mode of the robot 2 is controlled by hitting back the ball Q flying from the front with the racket R held in one hand 23 similarly based on the model (refer to FIG. 4(*a*) to FIG. 4(*c*) and FIG. 7(*a*) to FIG. 7(*c*)). Additionally, the model may be defined as a learning result of various motion modes such as a human kicks a ball with one foot, hits a ball with a golf club held in two hands, cuts a piece of paper with a pair of scissors held in one hand, applies paintings or glues on an object, assembles an object and so forth, and the motion mode of the robot 2 is controlled on the basis of the model.

Moreover, it is possible that the first processing element 210 sequentially defines the model along with a supplement to the determination result of the extrinsic feature factor $q_1$ and the intrinsic feature factor $p_2$ of the human 1; and the second processing element 220 controls the motion mode of the robot 2 on the basis of the model sequentially defined. Consequently, it is capable to control the motion mode of the robot 2 based on the model as the newest learning result of the motion mode of the human 1.

Furthermore, it is possible that the second processing element 220 sequentially defines the extrinsic feature factor $q_1$ which the robot 2 contacts, and controls the motion mode of the robot 2 on the basis of the sequentially defined extrinsic feature factor $q_1$. Accordingly, it is capable to control the motion mode of the robot 2 appropriately by considering the newest determination result of the extrinsic feature factor $q_1$ (the predicted position of the ball Q which varies with time), even in the case where an environment which the robot 2 contacts, consequently the extrinsic feature factor $q_1$ representing the environment varies.

It is possible that the first processing element 210 evaluates the deviation degree between the discrete correlation of the extrinsic feature factor $q_1$ and the intrinsic feature factor $p_2$ obtained from the determination result and the consecutive correlation of the extrinsic feature factor $q_1$ and the intrinsic feature factor $p_2$ defined according to the discrete correlation, and defines the model representing the consecutive correlation on the condition that the deviation degree is not greater than the threshold value. Further, it is possible to re-define the regular class when the model is re-defined.

According to the motion control system 200 with the above mentioned configuration, the model representing the consecutive correlation on the condition that the deviation degree between the discrete correlation of the extrinsic feature factor $q_1$ and the intrinsic feature factor $p_2$ and the consecutive correlation of the extrinsic feature factor $q_1$ and the intrinsic feature factor $p_2$ defined according to the discrete correlation is not greater than the threshold value. Accordingly, the model is defined appropriately form the viewpoint of representing the tendency of the motion mode of the human (first motion body) 1 in response to various environments. In addition, the extrinsic feature factor $q_1$ and the intrinsic feature factor $p_2$ are re-determined so that the condition is fulfilled, and the model may be re-defined according to the re-determined result. Therefore, the motion mode of the robot 2 may be controlled to follow the rough tendency of the motion mode of the human 1 on the basis of the model. In other words, it is possible to prevent an inappropriate model from being defined from the viewpoint of representing the rough tendency of the motion mode of the human 1, thereafter, avoiding the motion mode of the robot 2 being controlled inappropriately according to the inappropriate model.

Furthermore, it is possible for the first processing element 210 to define the model by removing a fraction or the entirety of the determined result of the extrinsic feature factor $q_1$ and the intrinsic feature factor $p_2$ so as to fulfill the condition.

According to the motion control system 200 with the above mentioned configuration, in order to fulfill the condition that the deviation degree between the discrete correlation of the extrinsic feature factor $q_1$ and the intrinsic feature factor $p_2$ and the consecutive correlation of the extrinsic feature factor $q_1$ and the intrinsic feature factor $p_2$ defined according to the discrete correlation is not greater than the threshold value, the determination result of the extrinsic feature factor $q_1$ and the intrinsic feature factor $p_2$ representing the discrete correlation is optionally selected. Accordingly, the model representing the consecutive correlation of the extrinsic feature factor $q_1$ and the intrinsic feature factor $p_2$ is defined based on the optionally selected determination result and the motion mode of the robot 2 is controlled based on the model. Therefore, it is possible to define an appropriate model from the viewpoint of representing the tendency of the motion mode of the human 1, thereafter, to control the motion mode of the robot 2 to follow the rough tendency of the motion mode of the human 1 based on the model.

Furthermore, it is possible for the first processing element 210 to define the model on the basis of the determination result of the extrinsic feature factor $q_1$ and the intrinsic feature factor $p_2$ when the human 1 reiterates a motion in a given style in a different environment. In the case where a plurality of the competitive regular classes are extracted, it is possible for the first processing element 210 to define a new style corresponding to the respective plurality of the regular classes. Thereafter, the first processing element 210 may re-define the model on the basis of the determination result of the extrinsic feature factor $q_1$ and the intrinsic feature factor $p_2$ when the human 1 reiterates the motion in the new style. Accordingly, in the case where plural models may be defined as the learning result of the motion mode of the human 1 according to one style, a plurality of new styles are defined. For example, the style that hitting the ball Q forehand with the racket R is defined into two new styles that one is to exert top spins to the ball Q with the racket R and the other is to exert back spins to the ball Q with the racket R. Further, the model is defined as the learning result of the motion mode of the human 1 in response to the respective new styles, and the motion mode of the robot 2 is controlled according to the model. For example, the robot 2 is controlled to hit back the ball flying from the front with the racket R held in the right hand 23 while exerting spins in a specific direction. Accordingly, regardless of the motion mode of the robot 2 being controlled according to one model, the robot 2 is prevented from moving in a different style in response to a similar environment.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A motion control system for controlling a motion mode of a second motion body by using a motion mode of a first motion body as a prototype, said first motion body and said second motion body being separate motion bodies, comprising at least one processor, the at least one processor further comprising:

a first processing element which repeatedly determines a fraction of an extrinsic factor representing an environment encircling the first motion body as an extrinsic feature factor and a fraction of an intrinsic factor representing the motion mode of the first motion body as an intrinsic feature factor for each motion reiterated by the first motion body in response to a different environment, and defines a model representing a consecutive correlation of the extrinsic feature factor and the intrinsic feature factor on the basis of a discrete correlation of the extrinsic feature factor and the intrinsic feature factor obtained from the determination result; and a second processing element which determines an extrinsic feature factor contacted by the second motion body, calculates a second motion body intrinsic feature factor on the basis of the determination result and the model defined by the first processing element, and controls the motion mode of the second motion body to implement at least the calculated second motion body intrinsic feature factor, wherein the first processing element evaluates a deviation degree between the discrete correlation of the extrinsic feature factor and the intrinsic feature factor obtained from the determination result and the consecutive correlation of the extrinsic feature factor and the intrinsic feature factor defined according to the discrete correlation, and defines the model representing the consecutive correlation on a condition that the deviation degree is not greater than a threshold value.

2. The motion control system according to claim 1, wherein the first processing element defines the model by removing a fraction or an entirety of the determination result of the extrinsic feature factor and the intrinsic feature factor so as to fulfill the condition.

3. The motion control system according to claim 1, wherein the first processing element determines the extrinsic feature factor and the intrinsic feature factor for each motion reiterated by the first motion body in a given style in response to a different environment.

4. The motion control system according to claim 1, wherein the first processing element sequentially defines the model along with a supplement to the determination result of the extrinsic feature factor and the intrinsic feature factor of the first motion body; and the second processing element sequentially controls the motion mode of the second motion body on the basis of the model sequentially defined by the first processing element.

5. The motion control system according to claim 1, wherein the second processing element sequentially determines the extrinsic feature factor contacted by the second motion body, and sequentially controls the motion mode of the second motion body on the basis of the sequentially determined extrinsic feature factor contacted by the second motion body.

6. The motion control system according to claim 1, wherein the first processing element determines a position of an object when an acting force is applied thereon by one movement of a specific part of the first motion body as the extrinsic feature factor, and a position of the specific part when the one movement is terminated as the intrinsic feature factor.

7. A motion control system for controlling a motion mode of a second motion body by using a motion mode of a first motion body as a prototype, said first motion body and said second motion body being separate motion bodies, comprising at least one processor, the at least one processor further comprising:

a first processing element which repeatedly determines a fraction of an extrinsic factor representing an environment encircling the first motion body as an extrinsic feature factor and a fraction of an intrinsic factor representing the motion mode of the first motion body as an intrinsic feature factor for each motion reiterated by the first motion body in response to a different environment, and defines a model representing a consecutive correlation of the extrinsic feature factor and the intrinsic feature factor on the basis of a discrete correlation of the extrinsic feature factor and the intrinsic feature factor obtained from the determination result; and a second processing element which determines an extrinsic feature factor contacted by the second motion body, calculates a second motion body intrinsic feature factor on the basis of the determination result and the model defined by the first processing element, and controls the motion mode of the second motion body to implement at least the calculated second motion body intrinsic feature factor, wherein the first processing element determines an intrinsic additional factor which is a fraction of the intrinsic factor for each motion reiterated by the first motion body in response to a different environment, extracts a regular class from the determination results of the extrinsic feature factor and the intrinsic feature factor of the first motion body by utilizing a condition that the respective determination result of the extrinsic feature factor and the intrinsic feature factor is related to determination points grouped in a high density in a space defined by the intrinsic additional factor as the regularity, and defines the model on the basis of the regular class.

8. The motion control system according to claim 7, wherein the first processing element defines the model on the basis of the determination result of the extrinsic feature factor and the intrinsic feature factor when the first motion body reiterates a motion in a given style in a different environment for a plurality of times; in a case where a plurality of competitive regular classes are extracted, the first processing element defines a new style corresponding to the respective plurality of the regular classes and re-defines the model on the basis of the determination result of the extrinsic feature factor and the intrinsic feature factor when the first motion body reiterates a motion in the new style for a plurality of times.

9. The motion control system according to claim 1, wherein the first processing element defines a plurality of local models having different domains of definition and a common property based on the determination result of the extrinsic feature factor and the intrinsic feature factor of the first motion body, and defines the model by connecting the local models in adjacent domains of definition.

10. The motion control system according to claim 9, wherein the first processing element defines a linear model as the local model having the common property.

11. The motion control system according to claim 9, wherein the first processing element defines the local model on the basis of the determination result of the extrinsic feature factor and the intrinsic feature factor by using a statistical method for extracting a local property of the model.

12. The motion control system according to claim 11, wherein the first processing element defines the local model by using LWPR (Locally Weighted Projection Regression) algorithm as the statistical method.

13. The motion control system according to claim 1, wherein the first processing element defines the model on the basis of the determination result of the extrinsic feature factor and the intrinsic feature factor of a human as the first motion body, and the second processing element controls the motion mode of a humanoid robot as the second motion body on the basis of the model defined by the first processing element.

14. A motion control method for controlling a motion mode of a second motion body by using a motion mode of a first motion body as a prototype, said first motion body and said second motion body being separate motion bodies and said second motion body being a robot which includes at least one processor, the at least one processor comprising a first processing element and a second processing element, comprising:

a first processing by the first processing element of repeatedly determining a fraction of an extrinsic factor representing an environment encircling the first motion body as an extrinsic feature factor and a fraction of an intrinsic factor representing the motion mode of the first motion body as an intrinsic feature factor for each motion reiterated by the first motion body in response to a different environment, and defining a model representing a consecutive correlation of the extrinsic feature factor and the intrinsic feature factor on the basis of a discrete correlation of the extrinsic feature factor and the intrinsic feature factor obtained from the determination result; and a second processing by the second processing element of determining which an extrinsic feature factor contacted by the second motion body, calculating a second motion body intrinsic feature factor on the basis of the determination result and the model defined by the first processing, and controlling the motion mode of the second motion body to implement at least the calculated second motion body intrinsic feature factor, wherein the first processing by the first processing element includes evaluating a deviation degree between the discrete correlation of the extrinsic feature factor and the intrinsic feature factor obtained from the determination result and the consecutive correlation of the extrinsic feature factor and the intrinsic feature factor defined according to the discrete correlation, and defining the model representing the consecutive correlation on a condition that the deviation degree is not greater than a threshold value.

15. A motion control program stored on a non-transitory computer readable medium for causing a computer to function as a motion control system for controlling a motion mode of a second motion body by using a motion mode of a first motion body as a prototype, said first motion body and said second motion body being separate motion bodies, which causes the computer to function as the motion control system, comprising:

a first processing element which repeatedly determines a fraction of an extrinsic factor representing an environment encircling the first motion body as an extrinsic feature factor and a fraction of an intrinsic factor representing the motion mode of the first motion body as an intrinsic feature factor for each motion reiterated by the first motion body in response to a different environment, and defines a model representing a consecutive correlation of the extrinsic feature factor and the intrinsic feature factor on the basis of a discrete correlation of the extrinsic feature factor and the intrinsic feature factor obtained from the determination result; and a second processing element which determines an extrinsic feature factor contacted by the second motion body, calculates a second motion body intrinsic feature factor on the basis of the determination result and the model defined by the first processing, and controls the motion mode of the second motion body to implement at least the calculated second motion body intrinsic feature factor, wherein the first processing element evaluates a deviation degree between the discrete correlation of the extrinsic feature factor and the intrinsic feature factor obtained from the determination result and the consecutive correlation of the extrinsic feature factor and the intrinsic feature factor defined according to the discrete correlation, and defines the model representing the consecutive correlation on a condition that the deviation degree is not greater than a threshold value.

16. The motion control method according to claim 14, wherein the first processing determines a position of an object when an acting force is applied thereon by one movement of a specific part of the first motion body as the extrinsic feature factor, and a position of the specific part when the one movement is terminated as the intrinsic feature factor.

17. The motion control program according to claim 15, wherein the first processing element determines a position of an object when an acting force is applied thereon by one movement of a specific part of the first motion body as the extrinsic feature factor, and a position of the specific part when the one movement is terminated as the intrinsic feature factor.

* * * * *